US008314390B2

(12) United States Patent
Micko

(10) Patent No.: US 8,314,390 B2
(45) Date of Patent: Nov. 20, 2012

(54) PIR MOTION SENSOR SYSTEM

(75) Inventor: Eric Scott Micko, Rescue, CA (US)

(73) Assignee: Suren Systems, Ltd., Hong Kong (HK)

(*) Notice: Subject to any disclaimer, the term of this patent is extended or adjusted under 35 U.S.C. 154(b) by 782 days.

(21) Appl. No.: 12/512,415

(22) Filed: Jul. 30, 2009

(65) Prior Publication Data

US 2009/0302220 A1 Dec. 10, 2009

Related U.S. Application Data

(63) Continuation-in-part of application No. 11/853,220, filed on Sep. 11, 2007, now Pat. No. 7,579,595.

(60) Provisional application No. 60/843,173, filed on Sep. 11, 2006.

(51) Int. Cl.
*G01J 5/00* (2006.01)

(52) U.S. Cl. .................................................... 250/338.3

(58) Field of Classification Search .... 250/338.1–338.5, 250/339.01–339.15, 340, 341.1–341.8
See application file for complete search history.

(56) References Cited

U.S. PATENT DOCUMENTS

| | | | | |
|---|---|---|---|---|
| 3,829,693 | A | 8/1974 | Schwarz | |
| 4,466,748 | A | 8/1984 | Needham | |
| 4,616,136 | A * | 10/1986 | Ball et al. | 250/338.3 |
| 4,618,854 | A | 10/1986 | Miyake et al. | |
| 4,864,136 | A | 9/1989 | Behlke | |
| 4,912,748 | A | 3/1990 | Horii et al. | |
| 5,126,718 | A | 6/1992 | Doctor | |
| 5,219,226 | A | 6/1993 | James | |
| 5,313,060 | A | 5/1994 | Gast et al. | |
| 5,420,567 | A | 5/1995 | Schwarz | |
| 5,432,350 | A | 7/1995 | Kuritani et al. | |
| 5,461,231 | A | 10/1995 | Sugimoto et al. | |
| 5,479,258 | A | 12/1995 | Hinnrichs et al. | |
| 6,163,025 | A | 12/2000 | Pantus | |
| 6,215,399 | B1 | 4/2001 | Shpater | |
| 6,239,433 | B1 | 5/2001 | Porter | |
| 7,183,912 | B2 | 2/2007 | Micko | |
| 7,399,969 | B2 | 7/2008 | Micko | |
| 7,399,970 | B2 | 7/2008 | Micko | |
| 2005/0236572 | A1 | 10/2005 | Micko | |
| 2008/0074252 | A1 | 3/2008 | Micko | |

FOREIGN PATENT DOCUMENTS

| | | |
|---|---|---|
| EP | 0953952 | 11/1999 |
| GB | 2201770 | 9/1988 |

OTHER PUBLICATIONS

International Search Report and Written Opinion dated Feb. 28, 2011 for PCT/US2010/043113.

* cited by examiner

*Primary Examiner* — Kiho Kim
(74) *Attorney, Agent, or Firm* — Stephen C. Beuerle; Procopio Cory Hargreaves & Savitch LLP

(57) ABSTRACT

A passive infrared sensor has two or more detector element arrays, each consisting of positive polarity and negative polarity elements. The signals from the arrays are both summed together and subtracted from each other, and if either the sum or difference signal exceeds a threshold, detection is indicated.

22 Claims, 6 Drawing Sheets

PIR MOTION SENSOR SYSTEM

RELATED APPLICATIONS

The present application is a Continuation-In-Part of co-pending U.S. patent application Ser. No. 11/853,220 filed on Sep. 11, 2007, which claims the benefit of U.S. provisional patent application No. 60/843,173 filed on Sep. 11, 2006, and the contents of each of the aforementioned applications are incorporated herein by reference in their entirety.

BACKGROUND

1. Field of the Invention

The present invention relates generally to motion sensors and to systems incorporating such sensors, and is particularly concerned with a PIR motion sensor system.

2. Related Art

This application is related to the following U.S. patents and patent application, which are incorporated herein by reference in their entirety: U.S. Pat. Nos. 7,183,912; 7,399,970; 7,399,969; 11/134,780. These related patents and application disclose simple PIR motion sensors with low false alarm rates and minimal processing requirements that are capable of discriminating smaller moving targets, e.g., animals, from larger targets such as humans, so that an alarm is activated only in the presence of unauthorized humans, not pets.

Particularly with respect to ceiling-mounted sensors, owing to the use of positive and negative detector elements, it is possible for signals from objects to be monitored to cancel along some lines of bearing. In other words, ceiling-mounted detectors inherently have longer detection ranges along some lines of bearing and shorter detection ranges along other lines of bearing. As understood herein, it is desirable to provide a single ceiling-mounted detector that has relatively uniform detection capability along all lines of bearing.

SUMMARY

Embodiments described herein provide for a PIR motion sensor system.

In one embodiment, a PIR motion sensor system includes first and second arrays of pyroelectric elements. A processor receives respective first and second signals representative of the outputs of the first and second arrays. The processor adds the first and second signals together to establish a sum signal and subtracts the first signal from the second signal to establish a difference signal. The processor then determines, for each of the sum signal and the difference signal, whether detection should be indicated.

In non-limiting implementations the difference signal can be generated by reversing the polarity of the first signal and then adding the first signal with polarity reversed to the second signal. Each non-limiting array may include at least four elements, two with positive polarity and two with negative polarity. Each element in the first array may be azimuthally straddled by elements of the second array. In some embodiments the elements of each array are electrically connected to each other in the following azimuthal order with respect to polarity: positive to negative to positive to negative. The sensor can be mounted on the ceiling to establish a relatively uniform detection space independent of an object's azimuth from the sensor, or the sensor can be mounted on ground or table surface facing upwards, on a vertical pole, or on a wall.

In another aspect, a passive infrared sensor has two or more detector element arrays. Each array consists of positive polarity elements and negative polarity elements. Signals from the arrays are both summed together and subtracted from each other for at least some detection cycles. Detection and/or motion is indicated if either the sum signal or the difference signal exceeds a threshold.

In still another aspect, a computer readable medium is executable by a processing system to receive first signals from a first array of pyroelectric elements and to receive second signals from a first array of pyroelectric elements. The logic includes adding the first signal to the second signal to establish a sum signal and subtracting the first signal from the second signal to establish a difference signal. Only if neither the sum signal nor the difference signal meets a detection criteria, detection is not indicated. Otherwise detection in indicated.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a motion sensing system including a passive infrared sensor system having multiple detector elements and a processor which processes signals from the detector elements and indicates motion detection if predetermined detection criteria are met.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
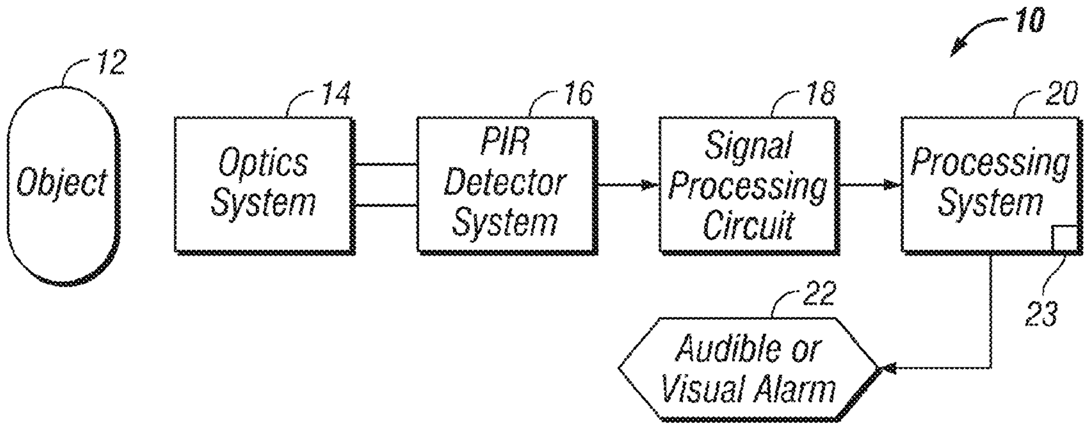
FIG. 1 is a block diagram of the system architecture of one embodiment of a PIR motion sensor system.

Referring initially to FIG. 1, a sensor system is shown, generally designated 10, for detecting a moving object 12, such as a human. The system 10 includes an optics system 14 that can include appropriate mirrors, lenses, and other components known in the art for focusing images of the object 12 onto a passive infrared (PIR) detector system 16. In response to the moving object 12, the PIR detector system 16 generates a signal that can be filtered, amplified, and digitized by a signal processing circuit 18, with a processing system 20 (such as, e.g., a computer or application specific integrated circuit) receiving the signal and determining whether to activate an audible or visual alarm 22 or other output device such as an activation system for a door, etc. in accordance with the logic herein and illustrated in a non-limiting embodiment by FIG. 7. The logic may be implemented on a computer readable medium 23 associated with the processing system 20. The computer readable medium may be logic circuits, solid state computer memory, disk-based storage, tape-based storage, or other appropriate computer medium.

Figure 2:
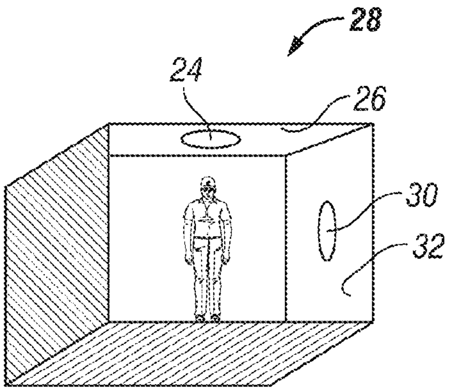
FIG. 2 is a schematic view showing alternative sensor arrangements for use in a PIR motion sensor system, with one sensor arrangement mounted on a ceiling, and another sensor arrangement mounted on a wall.

The PIR detector system and associated optics system may be appropriately mounted in a space to be monitored. The sensor may be mounted on a ceiling 26 as illustrated at 24 in FIG. 2. Alternatively, the sensor may be mounted to face upwards on a floor, table or other horizontal surface, or on a vertical pole, or may be mounted on a wall 32 as indicated at 30 in FIG. 2. In other embodiments, sensors may be provided at different locations in a room. Such systems may comprise part of an object or fixture in the room, such as a light fixture, lamp, or the like, along with the appropriate optical system for directing IR radiation onto the detectors. The mounting can be accomplished using adhesives, fasteners, and the like.

Figure 3:
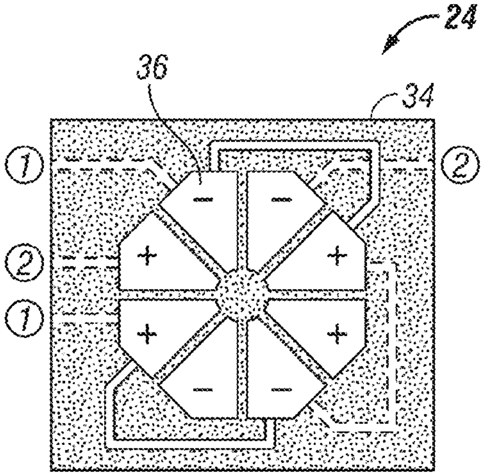
FIG. 3 is a plan view of one embodiment of a PIR element array.
Figure 4:
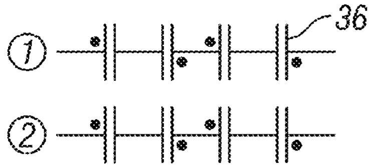
FIG. 4 is a schematic symbol diagram representing the PIR elements in FIG. 3 as capacitors with the dots indicating polarity.

Having described the overall system architecture, reference is now made to FIGS. 3 and 4, which show a first embodiment of a PIR sensor. As shown, the PIR detector system 24 in this embodiment comprises a single, preferably ceramic substrate 34 on which are formed first and second PIR element groups, also referred to herein as "arrays", and labeled "1" and "2" in FIGS. 3 and 4.

As shown, each group includes four elements 36, with each element 36 having a positive or negative polarity, it being understood that greater or fewer elements per group may be used. As shown best in FIG. 3, the elements of group "1" are electrically connected to each other and to, e.g., the signal processing circuit 18/processing system 20 shown in FIG. 1. Likewise, the elements of group "2" are electrically connected to each other and to, e.g., the signal processing circuit 18/processing system 20 shown in FIG. 1. The elements of each group may be electrically connected to each other in the following azimuthal order with respect to polarity: positive to negative to positive to negative. As shown in FIG. 3, in some embodiments one positive element and one negative element from each group may be connected off-chip to external circuitry. Group "1" elements are azimuthally staggered with respect to group "2" elements, i.e., each element of group "1" is straddled by elements of group "2" and vice-versa as shown.

The two groups of arrays may be thought of as two detectors. It is to be understood that the detectors are pyroelectric detectors that measure changes in far infrared radiation. Such detectors operate by the "piezoelectric effect", which causes electrical charge migration in the presence of mechanical strain. Pyroelectric detectors take the form of a capacitor, i.e. two electrically conductive plates separated by a dielectric. The dielectric is often a piezoelectric ceramic. When far infrared radiation causes a temperature change (and thus some mechanical strain) in the ceramic, electrical charge migrates from one plate to the other. If no external circuit is connected to the detector, then a voltage appears as the "capacitor" charges. If an external circuit is connected between the plates, then a current flows.

In any case, the detector 24 produces two separate signals in response to images passing over the detector due to, e.g., humans passing through the monitored sub volumes created by the compound optics 14 (FIG. 1). As set forth further below in reference to FIG. 7, the two signals can be, on the one hand, added together, and, on the other hand, added together with one of the signals' polarity reversed with respect to the signal baseline (thus in effect subtracting one signal from the other). This process, which is executed in at least some detection cycles, creates two new signals, referred to herein as the "sum" and "difference" signals.

Figure 5:
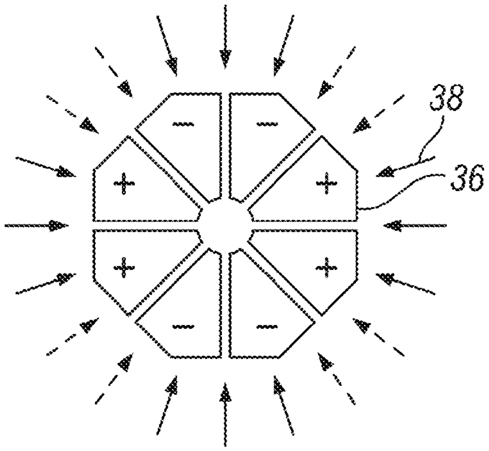
FIG. 5 is a schematic diagram showing employment of the "sum" signal.
Figure 6:
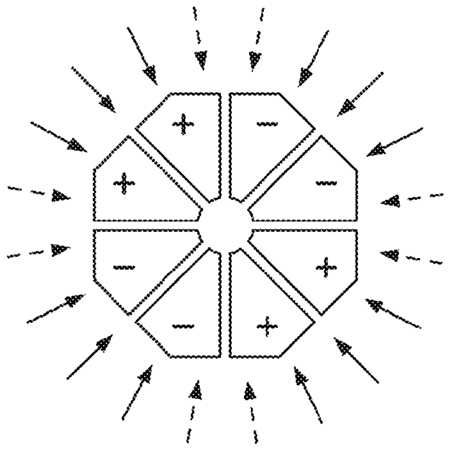
FIG. 6 is a schematic diagram showing employment of the "difference" signal.
Figure 7:
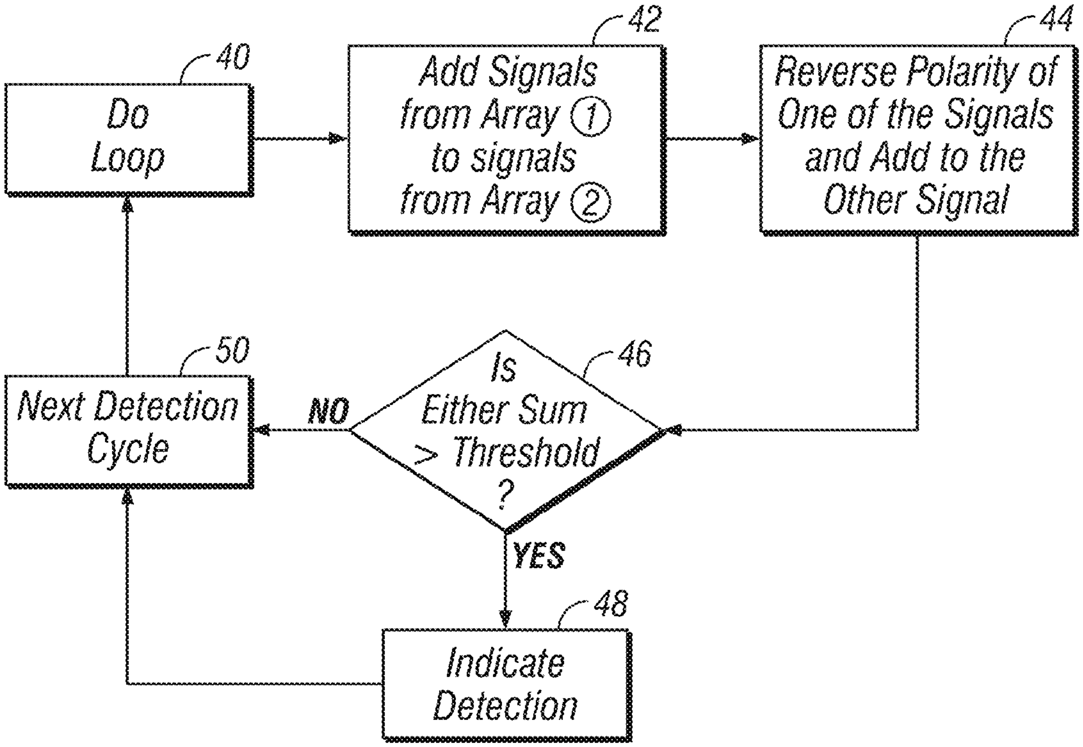
FIG. 7 is a flow chart illustrating one embodiment of the system logic.

Prior to discussing the logic of FIG. 7, reference is first made to FIGS. 5 and 6 for a graphical depiction of the operation of the present detector. The arrows 38 indicate infrared radiation impinging on the elements 36.

As illustrated in FIGS. 5 and 6, in response to image shapes that lie at different angles across the plane of the detector (caused by a human moving around the sensor at relatively long range), the two new signals each are largest when the image shapes lie along four orthogonal directions, but the two signals largest response directions are offset from each other by forty five degrees. Specifically, in FIG. 5, in the case where the "sum" signal is employed, the detector 24 functions as a single array, with its eight detector elements 36 having the polarities shown. Arrows 38 show directions from which the detector array is sensitive to radiation comprising images arriving from lenses (or other optical elements) oriented in the direction of the arrows. Dashed arrows show image orientation directions (at about forty five degree angles to the solid arrows) to which the detector array is much less sensitive, because the images fall on both (+) and (−) polarity elements (whose signals are summed as polarized, thus yielding little signal).

FIG. 6 shows the same detector element array as FIG. 5, except with four of its elements' polarities reversed, so as to indicate the effect of employing the "difference" signal. Arrows 38 again show directions from which the detector array is sensitive to radiation comprising images arriving from lenses (or other optical elements) oriented in the direction of the arrows. Dashed arrows show image orientation directions (at about forty five degree angles to the solid arrows) to which the detector array is much less sensitive, because the images fall on both (+) and (−) polarity elements (whose signals are summed as polarized, thus yielding little signal).

Thus, in effect, by choosing whether to consider the sum or difference signals from such a detector array, a PIR sensor may vary its detection directional orientation. However, in a non-limiting implementation, the sensor is designed not to be directionally selective, but rather to provide relatively uniform coverage regardless of azimuth.

One embodiment of a processing system and method for processing signals from the detector element array is illustrated in FIG. 7. At block 40 of FIG. 7, a "DO" loop is entered for each of at least some detection cycles, wherein at block 42 the signals from array "1" are added to those from array "2" to yield the above-discussed "sum" signal. Additionally, at block 44 the polarity of one of the array signals is reversed and added to the signal from the other array, in effect producing the above-discussed "difference" signal. At decision diamond 46 it is determined whether either one of the signals (i.e., either the "sum" or "difference" signal) exceeds a threshold. Typically, the amplitude of the signal is used for this purpose. If the threshold is exceeded, detection is indicated at state 48 and an output device such as the audible or visual alarm device 22 of FIG. 1 is activated. From state 48, or from decision diamond 46 if neither the "sum" nor the "difference" signal exceeded the threshold, the logic enters the next detection cycle at block 50.

It is to be understood that equivalently, the test at decision diamond 46 may be executed immediately after block 42, and if the "sum" signal exceeds the threshold the logic can flow directly to block 48, bypassing the need to calculate the "difference" signal at block 44. In such an implementation, in the event that the "sum" signal does not trigger a detection determination, the "difference" signal may then be determined and tested against the threshold. In this latter embodiment, both the "sum" and "difference" signals are calculated in some, but not all, detection cycles. In another alternative, only the larger of the two signals (sum and difference signals) is compared to the threshold in decision block or step 46.

In effect, the use of the two sets of directional signals is to combine them in a signal peak height logical "OR" arrangement. This is to say that both signals are evaluated by the processing system 20, so that either the "sum" signal OR the "difference" signal exceeding a threshold may indicate detection. In effect, this combines the best detection directions from both signals, by ignoring the smaller signal. The outcome is a lack of relatively insensitive detection directions in a ceiling mounted PIR sensor, and instead, relatively uniform sensitivity in all directions. This provides an omni-directional sensing ability.

Present principles are not limited to ceiling mounted sensor applications, as discussed above in the case of the wall-mounted sensor 30. Because the detector enables creation of a sensor that detects moving images oriented along any axis, a wall mounted sensor 30 (i.e. with the plane of its detector's substrate approximately parallel to the wall) can be mounted in any detector rotational orientation. Additionally, the detector array along with the appropriate optics could alternatively be mounted on a table or ground surface. Because the sensor can be used interchangeably on the ceiling, an upwardly facing surface, a vertical pole, or the wall, an entirely new class of PIR motion sensor is provided that is a universal commodity which is very easy both to keep in stock and to install.

Furthermore, the detector array may have more or fewer elements than those shown, and with more or fewer groups of elements whose signals can be combined by addition, subtraction or by other means. Also, the binary concept of splitting each element into two halves is not presented as a limiting concept for organizing the detector element arrays.

As noted above, an optical system 14 is associated with the PIR detector system in order to direct IR radiation from different directions onto the detector array. The optical system may include appropriate mirrors, lenses, and other components known in the art for focusing images of the object 12 onto a passive infrared (PIR) detector system 16. A long-range ceiling-mount PIR sensor is typically mounted in the center of a monitored area, so that radiation may enter the sensor's optics from any direction within a near-half-spherical volume. Compound lenses or the like may be located in a near half-spherical array about the detector beneath the ceiling in order to direct radiation onto the detector elements in the array. Alternatively, suitable optical elements may be arranged in a ring about the detector array at an appropriate spacing beneath the ceiling, or a continuous ring-shaped optical element may be used, such as a Fresnel prism or cylindrical Fresnel lens. Such optical arrangements may be incorporated in a light fixture or other ceiling mountable fixture.

Figure 8:
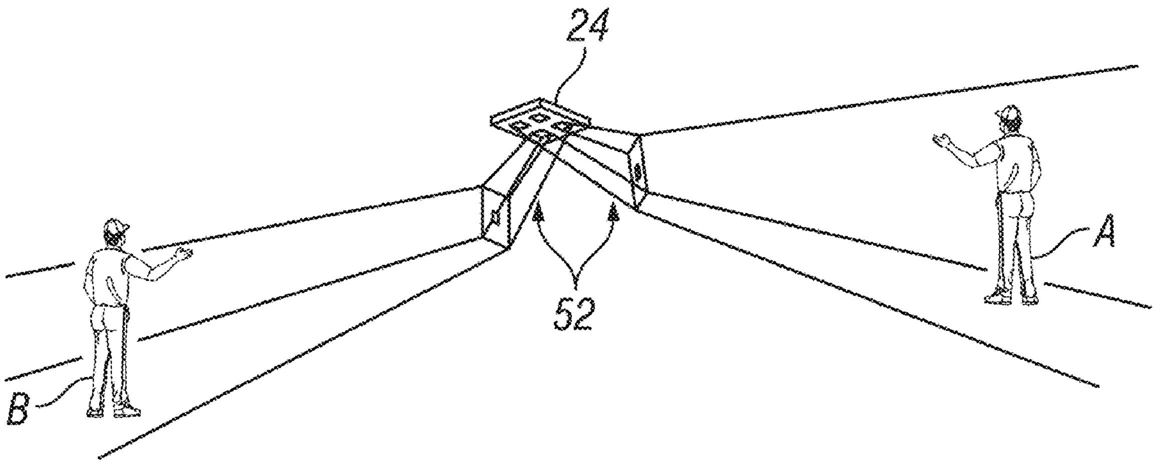
FIG. 8 is a schematic view illustrating individuals at a distance from a ceiling-mounted detector element array in the monitored sub-volumes established by two different optical elements of the optical system, with a simple, typical four-element detector-element array.

The omni-directional sensor described above in connection with FIGS. 1 to 7 provides uniform motion detection in all azimuthal directions, most uniquely (given typically available optics) at medium distance ranges from the sensor. Where a standard sensor is fitted with a standard four-element single-signal detector, signal reduction in certain directions, due to opposite-polarity signal cancellation, can be a problem. Now, when humans are near to such a sensor, or directly under it, their images take a circular or short-oval form, and all of an image's radiation may fall on individual detector elements from time to time, thus producing robust positive or negative signals. However, if they are at medium distance from the sensor, their images' radiation may spread across multiple detector elements, which gives rise to the non-uniform motion detection problem that is solved by the system described above in connection with FIGS. 1 to 7. FIG. 8 illustrates a typical situation, with humans at medium distances moving in different azimuthal angular directions with respect to detector array 24. Also shown in FIG. 8 are two lenses or other optical elements 52 which may form part of an array of such lenses or optical elements about the detector. It can be seen that the long axes of images may be aligned in any direction relative to the detector elements.

Figure 8A:
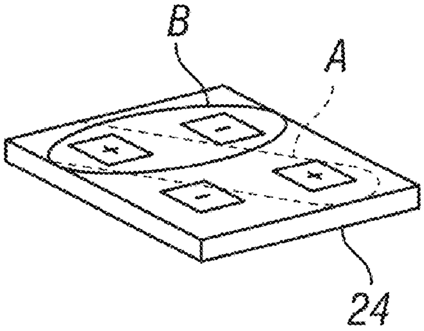
FIG. 8A is a schematic diagram illustrating images of the two objects of FIG. 8 on the array.

In a conventional four element PIR motion detector, all four elements are connected together in series, such that their individual signals are added together, in accordance with the polarity of each element. In a system where persons at medium distance ranges are moving at various azimuthal angles relative to the sensor, radiation comprising the image of Person "A" falls on two (+) polarity elements, and thus causes the detector to provide a large signal, as illustrated by the region circled in dotted lines in FIG. 8A. In contrast, radiation comprising the image of person "B" falls on one (+) and one (−) element, as illustrated by the region circled in solid lines in FIG. 8A, thus causing the detector to provide little signal. The sensor is therefore direction-sensitive. Such direction-sensitivity is reduced or avoided by the system described above in connection with FIGS. 1 to 7, because the PIR sensor 24 effectively varies its detection directional orientation when the processing system chooses to consider the sum or difference signals from the array.

Figure 9:
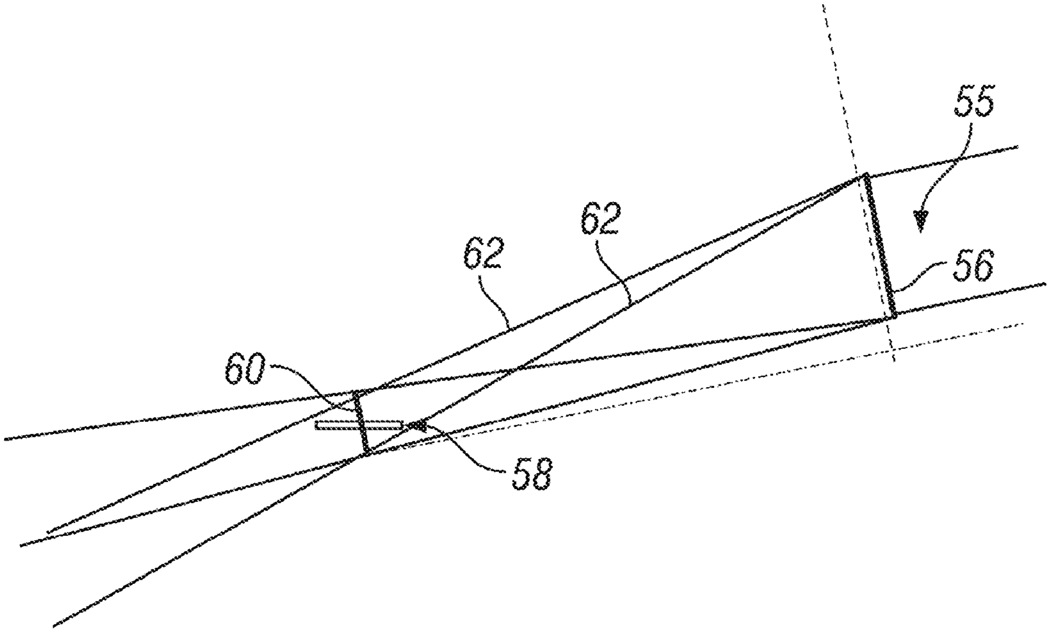
FIG. 9 is an optical diagram of one optical element directing radiation towards the array of FIGS. 3 to 6.

However, in the system described above in connection with FIGS. 1 to 7, there is still a potential for signal losses when movement occurs at a relatively large distance from the detector, depending on the arrangement of the optical system for directing IR radiation from such distances onto the detector array. This is illustrated in FIG. 9. In FIG. 9, IR radiation 55 from a long-range object, such as a person, is directed by lens element 56 onto the IR detection surface of a PIR motion detector array 58 (such as array 24 of FIGS. 3 to 6) which may be mounted on a ceiling or the like. The lens element may be part of a ring-shaped array of such elements mounted just below the detector array 58, or a part of a cylindrical optical element, or part of a dome-shaped optical array or dome-shaped optical element, or the like. An image 60 of the object can be formed near or at the detector, but many of the rays 62 forming the image are not incident on the detector. This condition results in an undesirably smaller detector signal than would otherwise result if all of the image's rays were incident on the detector. One way to avoid or reduce this problem is to mount the optical elements far enough below the detector element plane to allow a relatively high angle of light entry into the detector, keeping the image's radiation from spreading across too wide a distance and becoming too weak over the detection elements. However, it may be impractical to mount the optical elements far enough below the detector plane in many situations. Thus, though an image can be formed near the detector, many of the image's rays are not incident on the detector. This condition results in an undesirably smaller detector signal than would otherwise result if all of the image's rays were incident on the detector.

Figure 10:
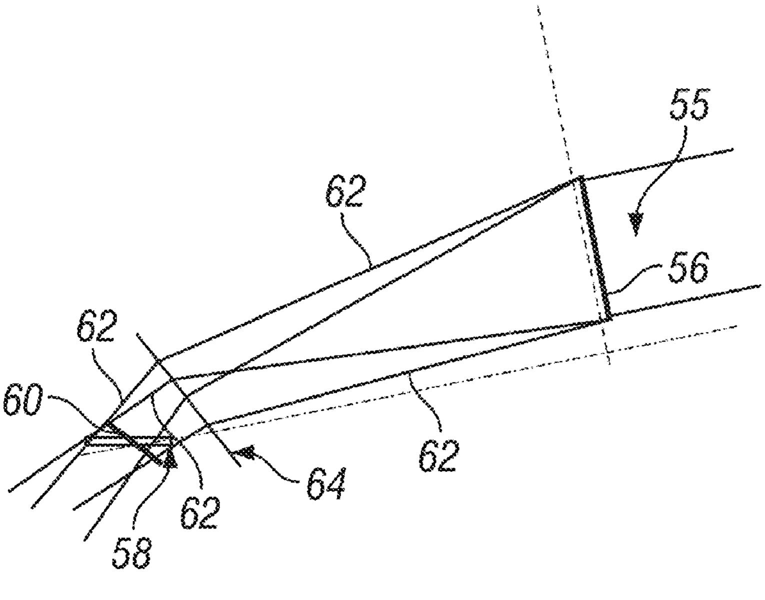
FIG. 10 is an optical diagram illustrating one embodiment of an optical system for use in the motion sensor system of FIG. 1 for directing radiation towards the detector element array of FIGS. 3 to 6.

FIG. 10 illustrates one embodiment of an optical assembly designed to avoid or reduce this problem and direct more of the image onto the detection elements. As illustrated in FIG. 10, a secondary optical element 64 is placed between the primary optical element 56 and the detector 58, in order to modify the image position so that more of its rays 62 are incident on the detector. The secondary optical element 64 may be any type that might be appropriate for the application, such as a lens, a mirror, a prism, a Fresnel version of one of the foregoing, a diffractive element, or the like. In one embodiment, an array of secondary optical elements 64 may be arranged around the detector, or a continuous ring-shaped optical element such as a Fresnel prism or cylindrical Fresnel lens may be used The primary optical element in this case may be an array of lenses or other optical elements, or may also be a continuous ring-shaped optical element outside the secondary element 64, such as a Fresnel prism or cylindrical Fresnel lens. The entire optical assembly may be mounted in a suitable support frame or housing designed for ceiling mounting under the detector. As illustrated in FIG. 10, the secondary optical element is positioned relatively close to the detector and angled so as to direct more IR radiation onto the detector element array and thus provide larger signals to the processing system for analysis. The secondary element 64 in one embodiment may be at an angle of around 20 degrees to 90 degrees to the detector element plane.

The foregoing description has concentrated on the provision of uniform motion detection in all azimuthal directions. However, the PIR motion sensor system described above is also able to resolve motion and produce signal outputs for moving objects of different sizes and at arbitrary directions from the detector, with the size of the object to be resolved dependent on the arrangement of the optical elements directing radiation onto the detector. A larger radiation image from an object such as a human is capable of covering two or more elements of the detector element array. As described above, such an object provides a better or larger output signal in one of the two "sum" or "difference" configurations, as its leading and trailing edges cross the detector either at closer-to-orthogonal or closer-to 45 degree angles. When an edge of such an object's radiation moves from one detector element to another, an increase in signal is seen either in the "sum" or the "difference" signal, depending on the direction of the object relative to the detector.

The detector output is based on change in radiation received at the detector elements as a result of motion of an IR emitting object, and there is no signal if there is no motion. When a large object moves across the monitored sub-volume established by one or more of the optical elements, the leading edge of its radiation produces a signal output in successive detector elements across which it passes. This in turn produces a large output signal in either the sum or difference signal configuration, depending on direction, indicating motion detection. Small objects also produce a signal output in either the sum or difference signal configuration as their radiation travels from one element to the next.

Figure 11:
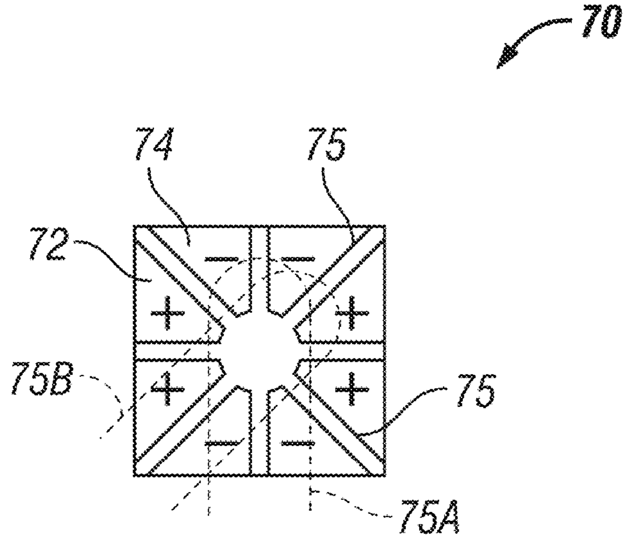
FIG. 11 is a schematic diagram illustrating a modification of the PIR detector element array of FIG. 3.

FIG. 11 illustrates an alternative embodiment of an eight element detector array 70, where the eight element array of FIGS. 3, 5 and 6 is expanded to fill a square area. This is a four square array, with each element divided into two parts 72, 74 along a forty-five degree angle or line of separation 75. FIG. 11 also illustrates two possible radiation images 75A and 75B superimposed on the detector element array, and in the process of moving across the array, one in a generally orthogonal direction, and the other in a direction at 45 degrees to the array. In the arrangement of FIG. 11, where the sum signal is employed, the detector is more sensitive to such images' radiation arriving in the orthogonal direction (75A). When the polarities of four of the elements are reversed to produce the difference signal (as in FIG. 6 above), the sensor is more sensitive to such images' radiation arriving from optical elements in the 45-degree azimuthal direction. In fact, this sensor arrangement produces a better detector signal without cancellation in one of the two (sum or difference) signal configurations for radiation from a larger object arriving from any direction, not just orthogonal and 45 degree directions, as radiation from an optical element at any angle arrives at the detector plane either at a closer-to-orthogonal angle or a closer to forty five degree angle.

Figure 12:
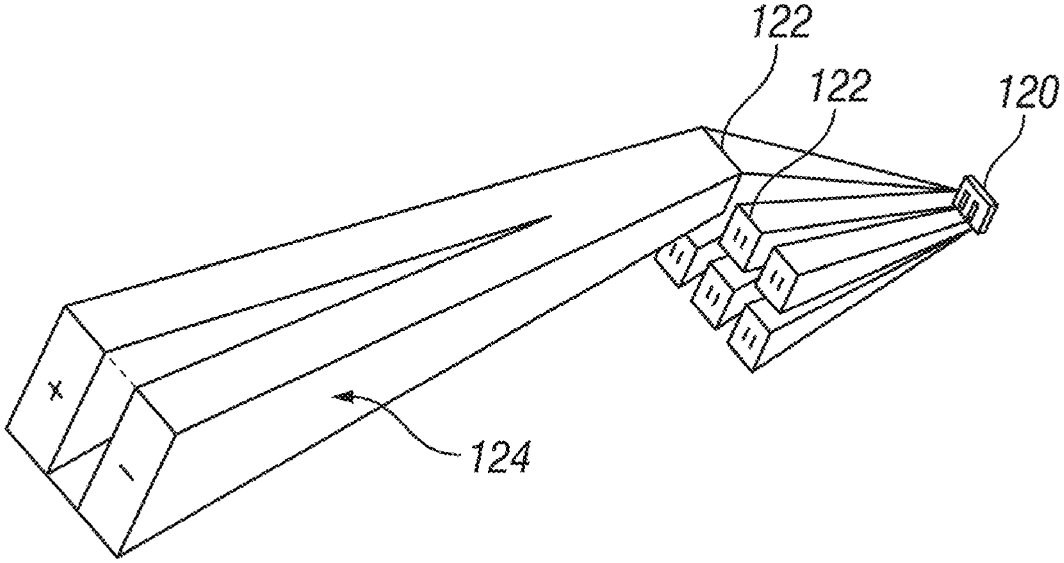
FIG. 12 is a schematic diagram illustrating a simple two element sensor with compound optics which focus IR radiation from monitored sub-volumes of the monitored space into an image appearing on the sensor.

As noted above, in order to monitor a large space with only a small detector array, PIR motion detectors are designed with multiple optical components which focus the IR radiation from objects within successive sub-volumes of the monitored space into an image appearing on the detector. This is schematically illustrated in FIG. 12 for a simple two element detector 120, where multiple optical components 122 or compound optics are arranged in front of the detector to monitor a desired space or volume. The optical components 122 effectively divide the space into a series of sub-volumes 124, so that a radiation producing target such as a human passing from sub-volume to sub-volume causes a change in radiation over successive detector elements as a result of a leading edge of the target moving across the monitored areas. An omni-directional detector has many such detector elements each of which, in conjunction with an optical element, forms a monitored sub-volume covering a part of a monitored area. In practice, there are large gaps between adjacent monitored sub-volumes depending on distance of the object from the sensor, as standard motion sensors assume a person walking through the area such that the body is large enough and sufficient movement is involved that a change of radiation is always produced on at least one detector element. This is adequate for intrusion sensing, but not for some applications of PIR motion sensors. One use of PIR motion sensor systems is in environmental lighting or climate control, so that lighting, air conditioning, heat or the like may be turned off to conserve energy when no human is present. At times, a person in a monitored area may move only slightly, and thus fail to cause sufficient signal at conventional motion detectors. Thus, lights or air conditioning may be undesirably switched off.

Figure 13A:
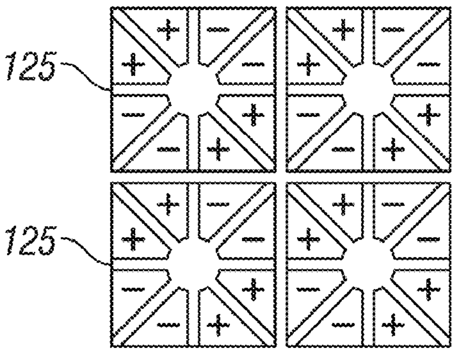
FIGS. 13A and 13B illustrate transverse cross-sectional views or patterns through the monitored sub-volumes for difference and sum configurations of four adjacent monitored sub-volumes of space resulting from mounting the eight element sensor of FIG. 11 behind a compound optics arrangement designed to direct radiation onto the sensor.
Figure 13B:
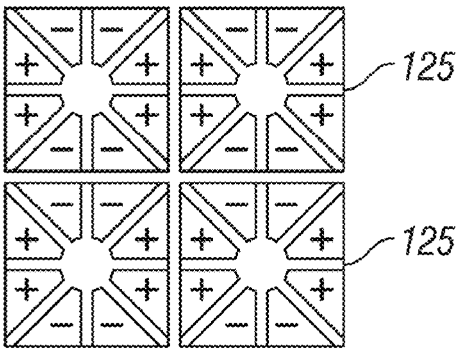

In one embodiment of an eight (or more) element, omni-directional motion detector system as described above, the optical elements are arranged such that there is substantially no gap between adjacent monitored sub-volumes of each optical element at a predetermined distance from the optical elements (such as at the perimeter of the monitored space), as illustrated in FIGS. 13A and 13B. FIGS. 13A and 13B illustrate adjacent transverse cross-sectional views 125 through the monitored sub-volumes of four adjacent optical elements forming part of the compound optics for the eight element detector of FIG. 11. In the "difference" signal configuration of FIG. 13A, the leading edge of a large body such as a human traveling in any 45 degree or close to 45 degree direction causes a detection output signal. Additionally, any small movement made by a person who is seated or otherwise substantially unmoving in the area also causes a change in signal in at least one detector element. Similarly, in the "sum" signal configuration of FIG. 13B, the leading edge of a body traveling in any orthogonal direction produces detection output signal. This is also true for small bodies moving across the monitored sub-volumes or for small movements of a person seated or otherwise unmoving in the area, such as movement of a hand. This results in easy attainment of good motion detection in any of the eight different directions of a large moving object's leading edge or small movements of a person who is not moving through the area but moves only a small part of their body in any of the eight directions.

Figure 14A:
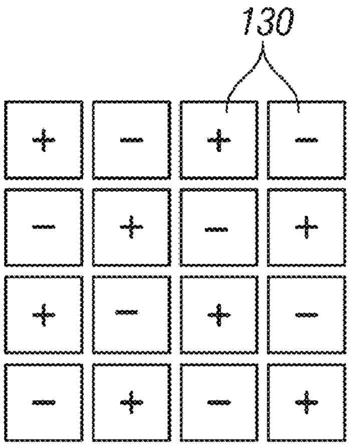
FIGS. 14A and 14B illustrate corresponding cross-sectional views through monitored sub-volumes for difference and sum configurations of a sensor comprising an array of sixteen square detector elements.
Figure 14B:
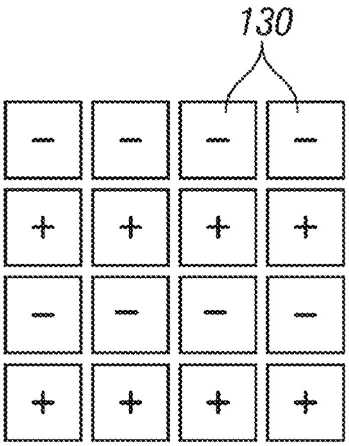

As noted above, the eight element array of FIG. 11 is effectively a four square element array in which each element is bisected by a 45 degree line of separation 75, forming eight triangular elements as seen in FIG. 11. A non-orthogonal line of separation or detector element edge produces better detection function than patterns which lack such a non-orthogonal angle, as can be seen by comparison of the monitored sub-volume cross-sectional patterns of FIGS. 13A and 13B with those of FIGS. 14A and 14B. As explained above, the monitored sub-volume patterns of FIGS. 13A and 13B with detector elements each having a non-orthogonal edge produces good motion detection in any of eight possible directions of movement (four orthogonal and four at 45 degrees) of an object across the monitored area. FIGS. 14A and 14B illustrate monitored sub-volume cross-sectional patterns established by a detector having multiple square elements 130, with FIG. 14A illustrating the pattern for a "minus" signal configuration and FIG. 14B illustrating the pattern for a "plus" signal configuration. The configuration of FIG. 14A produces good signals from 45 degree leading edge objects, but the configuration of FIG. 14B can only produce a good signal along one of two orthogonal axes (i.e. the horizontal axis as viewed in FIG. 14B). Thus, this detector design produces good direction only in six directions, not eight. This illustrates the advantage of detector elements with non-orthogonal edges as illustrated in FIG. 11.

Figure 15:
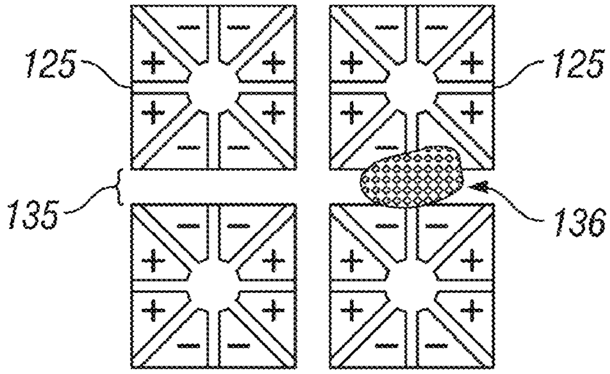
FIG. 15 illustrates a modification of the monitored sub-volume cross-section patterns of FIG. 13A in which the optical system is arranged such that a gap between adjacent monitored sub-volumes is not greater than the size of the smallest object for which motion is to be detected.

As has been explained above, the detector system described in the above embodiments in connection with FIGS. 1 to 11 and 13 produces a signal without cancellation in at least one of the sum and difference signal configurations, regardless of direction, if the detector is receiving radiation from multiple monitored sub-volumes from multiple optical elements. At the same time, the detector is still able to resolve movement of smaller objects (that is, of a size equal to or smaller than one detector element), which produces good signals as the smaller object moves from element to element. In FIG. 13A and 13B, the optical system is arranged such that there is essentially no gap between adjacent monitored sub-volume cross-sectional patterns established by optical elements in the system at a given distance from the optical elements. However, there may be a small gap between the monitored sub-volumes while still allowing detection of small objects, if the optical elements or optics are arranged so that the distance between adjacent eight element monitored sub-volume cross-sectional patterns 125 (each due to the detector 70 working with a separate optical element) is no greater than the approximate size of the smallest object and its span of motion to be resolved by the sensor, for example, the span of motion of variously-sized human body parts. FIG. 15 illustrates a modified arrangement where a small gap 135 is provided between adjacent monitored sub-volume cross-sectional patterns 125 at a designated distance from the detector, such as the maximum distance of an object within the monitored space. In FIG. 15, the gap 135 is about equal to the size of the smallest object 136 to be resolved by the sensor. Thus, an omni-directional sensor system using an eight element detector array may be designed by appropriate adjustment of the optical system 14 so that the gap between adjacent monitored sub-volume established by the optical elements is no greater than the approximate size of the smallest object to be resolved, which may be of about the same size as a detector element.

The omni-directional sensor system using sum and difference signals as described above provides a new method of detecting minor motion, such as minor hand or arm movement, by providing many closely packed monitored sub-volumes, without causing potential problems as a result of signal cancellation during instances of major motion, as would be the case with a conventional motion detector where relatively large gaps between adjacent monitored sub-volumes is needed to reduce signal cancellation. Because of the sum and difference signal analysis, signal cancellation would only be present in one of the signal configurations, and thus many optical elements providing multiple, closely packed monitored sub-volumes be used in conjunction with the detector array to allow resolution of only small movements of small body parts. Additionally, the use of detector elements with non-orthogonal edges allows for resolution of movement, whether large or small body movement, in any of eight possible directions.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A horizontally mountable PIR motion sensor comprising: a detector comprising at least a first array of pyroelectric elements and at least a second array of pyroelectric elements; and at least one processor receiving respective first and second signals representative of the outputs of the first and second arrays, the processor adding the first and second signals together to establish a sum signal and subtracting the first signal from the second signal to establish a difference signal, the processor determining whether either the sum signal or the difference signal exceeds a threshold and indicating motion detection if either the sum signal or the difference signal exceeds the threshold, wherein each pyroelectric element has at least three edges, and at least one edge is non-orthogonal to the other edges.

2. A passive infrared sensor, comprising: at least first and second passive infrared detector element arrays; an output device which is adapted to be activated on detection of motion by the detector element arrays; and a processor which is adapted to receive first and second output signals from the first and second arrays, to add the first and second output signals to establish a sum signal and to subtract the first output signal from the second output signal to establish a difference signal; the processor determining whether at least one of the sum signal and the difference signal exceeds a threshold and activating the output device if either the sum signal or the difference signal exceeds the threshold.

3. The sensor of claim 2, wherein the difference signal is generated by reversing the polarity of a first signal from a first array and then adding the first signal with polarity reversed to a second signal of a second array.

4. The sensor of claim 2, wherein each array includes at least four elements, two with positive polarity and two with negative polarity.

5. The sensor of claim 4, wherein each element in a first array is azimuthally straddled by elements of a second array.

6. The sensor of claim 4, wherein each element has at least three edges, and at least one edge is non-orthogonal to the other edges.

7. The sensor of claim 6, wherein each element is generally triangular in shape.

8. The sensor of claim 7, wherein the detector elements are arranged in pairs, each pair forming a generally square shape with the non-orthogonal edges of each pair adjacent one another and bisecting the square shape at a forty five degree angle.

9. The sensor of claim 4, wherein the elements of each array are electrically connected to each other in the following azimuthal order with respect to polarity: positive to negative to positive to negative.

10. The sensor of claim 2, wherein the sensor is mounted on a ceiling.

11. The sensor of claim 2, wherein the sensor is mounted on an upwardly facing surface.

12. The sensor of claim 2, wherein the sensor is mounted on a vertical pole.

13. The sensor of claim 2, wherein the sensor is mounted on a wall.

14. A passive infrared sensor, comprising: at least first and second passive infrared detector element arrays; an output device which is adapted to be activated on detection of motion by the detector element arrays; a processor which is adapted to receive respective first and second output signals from the first and second arrays, the processor adding the first and second output signals to establish a sum signal, subtracting the first output signal from the second output signal to establish a difference signal, determining whether the larger signal of the sum and difference signals exceeds a threshold, and activating the output device if the larger of the sum and difference signals exceeds the threshold.

15. A computer implemented method of detecting motion in a monitored space, comprising: adding together the signals from at least first and second passive infrared detector element arrays to produce a sum signal; if the sum signal exceed a threshold value, providing an output indicating motion detection; if the sum signal does not exceed a threshold value, subtracting the signals from the arrays from each other to produce a difference signal; if the difference signal exceeds the threshold value, providing an output indicating motion detection; if neither the "sum" nor the "difference" signal exceeds the threshold value, providing no output detection signal; and repeating the preceding steps in a subsequent detection cycle.

16. A PIR motion sensor system, comprising: a PIR motion sensor comprising at least one array of infra red (IR) detector elements adapted for mounting in an area to be monitored; an optical system associated with the motion sensor which is adapted to direct IR radiation from objects in the area surrounding the motion sensor onto the detector element array; and at least one processor receiving signals from the array of IR detector elements and processing the signals to determine whether detection of movement should be indicated; the optical system comprising at least one primary optical element which intercepts IR radiation and directs intercepted radiation towards the IR detector element array, and at least one secondary optical element between the primary optical element and the detector which is positioned at an angle to the primary optical element and which is adapted to focus more of the intercepted IR radiation onto the detector arrays.

17. The system of claim 16, wherein the at least one primary optical element is selected from the group consisting of a lens, a mirror, a prism, a Fresnel lens, a Fresnel mirror, a Fresnel prism, and a diffractive element.

18. The system of claim 16, wherein the at least one secondary optical element is selected from the group consisting of a lens, a mirror, a prism, a Fresnel lens, a Fresnel mirror, a Fresnel prism, and a diffractive element.

19. The system of claim 16, wherein the PIR motion sensor comprises at least a first array and a second array of pyroelectric elements, and the at least one processor is adapted to receive respective first and second signals representative of the outputs of the first and second arrays, the processor adding the first and second signals together to establish a sum signal and subtracting the first signal from the second signal to establish a difference signal, the processor determining whether either the sum signal or the difference signal exceeds a threshold and indicating detection if either the sum signal or the difference signal exceeds the threshold.

20. A PIR motion sensor system, comprising: a PIR motion sensor comprising at least a first array and a second array of infra red (IR) detector elements adapted for mounting in an area to be monitored; an optical system associated with the motion sensor which is adapted to direct IR radiation from objects in the area surrounding the motion sensor onto the detector element array, the optical system comprising a plurality of optical elements which each direct radiation from a predetermined sub-volume of a space to be monitored towards the detector element arrays, the optical system being configured such that a gap between adjacent transverse cross-sections through the monitored sub-volumes established by adjacent optical elements in the system at a predetermined distance from the optical elements is not greater than the approximate size of the smallest object for which motion is to be detected; and at least one processor receiving respective first and second signals representative of the outputs of the first and second arrays, the processor adding the first and second signals together to establish a sum signal and subtracting the first signal from the second signal to establish a difference signal, the processor determining whether either the sum signal or the difference signal exceeds a threshold and indicating detection if either the sum signal or the difference signal exceeds the threshold.

21. The system of claim 20, wherein there is substantially no gap between adjacent transverse cross-sections through the optical element monitored sub-volumes.

22. The system of claim 20, wherein the gap is in the range from 0 to the span of motion of variously-sized human body parts.

* * * * *